Patented Aug. 21, 1945

2,383,252

UNITED STATES PATENT OFFICE 2,383,252

METHOD OF MAKING PLASTER RETARDER

Harry N. Huntzicker, Evanston, Ill., assignor to United States Gypsum Company, Chicago, Ill., a corporation of Illinois No Drawing. Application December 12, 1940, Serial No. 369,805

3 Claims. (Cl. 106—315)

The present invention relates to an improved form of retarder, which is a material employed to control the setting time of calcined gypsum plasters, and also to the process for the manufacture of the said retarder.

One of the objects of the invention is to produce a retarder, which is capable of prolonging the setting time of calcined gypsum plaster, from either animal or vegetable protein by a process involving the partial hydrolysis thereof under pressure and in the presence of unusually small amounts of caustic soda and quicklime or hydrated lime (CaO or Ca(OH)$_2$), the proportions of which latter may be varied over a considerable range.

A further object of this invention is to produce a plaster retarder that is substantially nonhygroscopic as compared with ordinary commercial retarders hitherto produced. Another object of this invention is to produce a retarder whose retarding efficiency is age-stabilized and retained whether the retarder is stored and aged as 100% retarder or in the usual small amounts present in commercial gypsum cement plasters. In other words, a gypsum plaster containing a retarder produced in accordance with the present invention will retain its originally adjusting setting properties through the usual period of warehouse aging under which ordinary cement plasters now produced would "age out" or, in other words, in which the aging process modifies the originally adjusted setting time.

In the art dealing with calcined gypsum plasters it has been a common practice to modify the setting time of these materials by incorporating therewith certain organic substances which inhibit the setting of the materials so as to permit their use as a wall plaster, for example, or for other purposes where a special adjustment of the setting time is required, so as to permit their mechanical application to the particular intended purpose. The usual types of retarders hitherto used for this purpose have been partially hydrolyzed animal or vegetable protein obtained by treating the raw protein material with a hydrolyzing agent, usually sodium hydroxide, whereupon the resulting product was mixed with a carrying medium, which in most cases was ordinary lime, either high calcium or dolomitic, hydrated or quicklime.

To my knowledge the function of the calcium ion in the manufacture of these retarders has not been given proper consideration as a factor in retarder processing. It will be pointed out hereinbelow in a further discussion of the present process that retarders which are efficient set-inhibitors are organic calcium salts which must be formed in the process of manufacture to make an efficient retarder, regardless of the amount of caustic soda used, which latter is usually considered as being the actual hydrolyzing medium and therefore an essential part of the retarder other than the protein constituents. In some processes of the prior art the use of lime has been described as an extender which was added to the hydrolyzed protein after the hydrolyzing reaction had been completed for the purpose of making a more easily dispersible retarder. Reference has been made in the past to the use of lime but in such case merely as a causticizing reagent in the hydrolzying reaction. The use of lime as a causticizer in the case of such a process does not apply to the present invention, since in the causticizing reaction the lime is precipitated as a carbonate, and its function is hence no more than that of any ordinary extender or diluent for the hydrolyzed retarder. I would like to point out very specifically that the use of lime as a causticizer or as an extender, after the hydrolyzing reaction has been completed with caustic soda, is quite different from the present invention.

If very large amounts of caustic soda are used in the hydrolyzing of the protein material, it is possible to obtain a retarder comparable in retarding efficiency to the retarder of the present invention, and in such a case the lime makes very little difference in the efficiency of the product, whether it is used as an extender or is cooked together with the caustic soda in the hydrolyzing process. In using these larger amounts of caustic soda, however, the retarder thus produced is very highly hygroscopic, is not stable to age, and is not a material comparable to the retarder of the present invention, which latter produces a really age-stabilized retarder of permanent and definitely predictable retarding efficacy. It is not believed that when such large amounts of caustic soda are used a stable retarder, which is a calcium salt of the organic hydrolysis product, can be formed.

In order to produce a retarder in which the calcium ion actually reacts with the hydrolyzed protein material, it is necessary to perform the hydrolyzing operation under pressure. As an illustration of this point, reference is made to Table I herein reproduced, showing the results of hydrolyzing soybean oil meal with various amounts of caustic soda to which hydrolysis batch lime has been added both before and after the cooking operation during which the meal is hydrolyzed.

TABLE I

*Hydrolysis at atmospheric pressure for 3 hours*

| Raw protein | Lbs. of caustic soda and lime added to 100 lbs. protein | | Setting time of $CaSO_4.\frac{1}{2}H_2O$ with 4 lbs. per ton retarder | |
|---|---|---|---|---|
| | NaOH | Lime | Lime added with caustic soda | Lime added after cooking |
| Soybean oil meal: | | | | |
| (1) | 20 | 30 | 4 hrs., 50 min. | 4 hrs., 40 min. |
| (2) | 10 | 30 | 3 hrs., 55 min. | 4 hrs. |
| (3) | 5 | 30 | 1 hr., 45 min. | 1 hr., 35 min. |

It should be observed that the efficiency of the retarder thus produced is not comparable with the efficiency of the retarder prepared from identical batches by a pressure hydrolysis in accordance with the present invention. It should be further observed, from the data in Table I, that there is very little or no difference in the retarding efficiency of a material produced when lime is added under such conditions either at the beginning or at the conclusion of the hydrolysis. It is apparent that a complete reaction of the lime itself with the retarder under these conditions is not obtained, mainly by reason of the fact that no superatmospheric pressure has been employed.

An effective method of producing a retarder from either animal or vegetable protein under the process of the present invention is substantially as follows: An autoclave is charged with 100 lbs. of raw protein material, 2½ lbs. of sodium hydroxide, and 30 lbs. of lime. Water is added in sufficient amount so that at the conclusion of the hydrolysis the product will flow out of the autoclave. This is a desirable but not an essential condition. Many excellent retarders have been made when the consistency of the mix has been adjusted so as finally to yield a light foam which may be compared in physical properties other than color to a heavy whipped cream. The autoclave is then closed and the pressure brought up by external heating to an internal steam pressure of 40 lbs. per sq. in., which pressure is held for one hour. At the end of this time the pressure is slowly released and the material removed from the autoclave and dried by any one of several processes. This includes the various types of thermal drying and also drying by means of a material such as quicklime, which dries the retarder by the chemical reaction with the water in the mix. After the retarder is dried, it is ground to a fineness of preferably not less than 96% through 100 mesh.

It has been observed in the manufacture of various batches of retarder by the process of the present invention that the reaction of the protein with the lime is evidenced by a marked change in color of the mix. In some instances the product of the lime reaction does not have a sufficiently different color to be particularly noticeable, but at least a small change usually does occur. For example, the hydrolyzed protein which is made under pressure in the presence of only the added caustic soda is much darker than that produced when lime is also used. The difference in color is more than the mere dilution of color one would ordinarily expect by the addition of the lime, and is quite apparent when comparing materials hydrolyzed with caustic soda and lime and material produced by hydrolysis with caustic soda followed by a later addition of the same amount of lime.

Data in Table II, herein reproduced, show the results of the pressure-hydrolysis of hoof meal and soybean oil meal and illustrate very clearly many of the points of novelty in the present invention.

TABLE II

*Hydrolysis at 40 lbs. per sq. in. pressure for 1 hour*

| Raw protein | Lbs. of caustic soda and lime added to 100 lbs. protein | | Setting time of $CaSO_4.\frac{1}{2}H_2O$ with 4 lbs. per ton retarder | |
|---|---|---|---|---|
| | NaOH | Lime | Lime added with caustic soda | Lime added after cooking |
| Hoof meal: | | | | |
| (1) | 20 | 30 | 31 hrs. | 25 hrs. |
| (2) | 5 | 30 | 29 hrs. | 6 hrs. |
| (3) | 2.5 | 30 | 31 hrs. | 2 hrs., 15 min. |
| Soybean oil meal: | | | | |
| (1) | 20 | 30 | 12 hrs., 50 min. | 10 hrs. |
| (2) | 10 | 30 | 14 hrs., 40 min. | 4 hrs., 10 min. |
| (3) | 5 | 30 | 14 hrs. | 2 hrs., 35 min. |
| (4) | 0 | 30 | 4 hrs., 35 min. | |

The No. 1 batch made with hoof meal, in which 20% caustic soda was used (on the basis of protein raw material) as indicated, has a high degree of retarding efficiency, but the material so produced is very highly hygroscopic and is not stable to aging. In the form of pure retarder it takes on water very rapidly and becomes lumpy, during which process the resulting expansion causes bag breakage and generally contributes to complaints of instability and erratic setting time when used in gypsum plasters. This material is somewhat more efficient so far as its retarding effect is concerned but in most respects is comparable to the greater proportion of retarders now on the market, all of which however have a high degree of undesirable hygroscopicity. The No. 2 batch, prepared from hoof meal, on which data is also contained in Table II, serves to illustrate the importance of protein-reacted lime in the retarder of the present invention. The use of 5% of caustic soda, without the lime in the cooking batch, produces a retarder which is only about 20 to 25% as efficient as that produced with the larger, but undesirable, amounts of caustic soda. On the other hand, when this small 5% of caustic soda addition is made in the presence of 30 lbs. of lime, as indicated in Table II, the efficiency obtained is practically the same as that obtained when using the larger, and again undesirable, amounts of caustic soda. The product produced as represented by batch No. 2 has lost most of the hygroscopic characteristics of a batch with 20% of caustic soda. It is quite stable to aging and is free from the greater part of the undesirable reactions that continue during aging in a retarder manufactured in a process such as that indicated by batch No. 1.

In the case of the hoof metal protein, it is possible to use as little as 2 or 2½% of caustic soda on the basis of the meal used, provided lime is also used during the hydrolysis. It is believed that no retarder has heretofore been made which has the unusually high efficiency of the hoof meal retarder No. 3 in Table II and which at the same time has the very desirable non-hygroscopic characteristic which contributes to the excellent properties of this retarder. Such a retarder is the one of the present invention.

The retarder batches 1, 2 and 3 made from soybean oil meal, as shown in Table II, illustrate the same points. In the case of the soybean oil meal, a material which contains less than half of the protein content of hoof meal has been used, and for this reason the retarder efficiencies are in a different range. However, in the case of the soybean oil meal retarder the efficiencies are still adequate to make this product a suitable one for commercially inhibiting the set of gypsum plasters or molding materials. In the case of an organic material which contains relatively large amounts of cellulose, as compared to hoof meal for example, it is necessary to use slightly larger amounts of caustic soda in order to have the same amount of excess over that taken up by the cellulosic material.

While the present invention has been illustrated by rather typical examples of the process as herein described and further illustrated in Table II, it is not intended to limit the invention solely to the use of lime in the production of stable, nonhygroscopic retarder. Although lime is the most desirable because of its relatively low market value, other materials may also be used, such as dolomitic lime or other oxides or hydroxides of the alkaline earth group of metals, including magnesia, all of which are intended to be covered by the term "alkaline earth" in the claims.

In the illustrations given in Table II, 30 lbs. of lime have been used with each 100 lbs. of protein, but it is not intended to limit the invention to the use of that particular amount of lime, although in all cases it forms the predominant material. Excellent results have been obtained by using 20 lbs. of lime to 100 lbs. of soybean oil meal. However, usually it is desirable to use as much as 30 lbs. of lime to 100 lbs. of protein in order to facilitate the grinding of the final product and to give it properties which make it more easy to handle in conveying systems and also easier properly to disperse in the plaster products.

The present invention therefore essentially concerns itself with the production of a substantially nonhygroscopic, age-stabilized retarder by pressure hydrolysis of animal or vegetable protein raw material by the use of hydrolyzing agents, preferably caustic soda, in the presence of sufficient lime or other alkaline earth oxide or hydroxide to produce an organic alkali earth or lime salt by reaction thereof with the hydrolyzed protein. Advantage is taken of the reaction of lime with the protein to make possible the production of a retarder in the presence of much smaller amounts of caustic soda or other hydrolyzing agent than has heretofore been considered possible. The lime reaction is in no way comparable to the previous use of lime merely as an extender for the retarder or as a causticizer in which the lime is precipitated as calcium carbonate with the accompanying formation of sodium hydroxide from sodium carbonate. While hoof meal, vegetable proteins and the like have been specifically disclosed, the invention may also be applied to organic wastes such as distillery slop, which is a material rich in protein.

What is claimed for the present invention is:

1. The process of producing a substantially non-hygroscopic and non-aging organic retarder for gypsum plasters which comprises hydrolyzing 100 parts of a protein with water under a steam pressure of about 40 pounds per square inch with from 2 to 5 parts of an alkali metal hydroxide in the presence of from 20 to 30 parts of calcium hydroxide for a time sufficient to produce a calcium compound of the hydrolyzation product.

2. The process of producing a substantially non-hygroscopic and non-aging organic retarder for gypsum plasters which comprises hydrolyzing about 100 parts of keratin with water under a steam pressure of about 40 lbs. per sq. in. with from 2 to 5 parts of an alkali metal hydroxide in the presence of from 20 to 30 parts of an alkaline earth metal hydroxide for about one hour.

3. The process of producing a substantially non-hygroscopic and non-aging organic retarder for gypsum plasters which comprises hydrolyzing about 100 parts of a vegetable protein with water under a steam pressure of about 40 lbs. per sq. in. with from 2 to 5 parts of an alkali metal hydroxide in the presence of from 20 to 30 parts of an alkaline earth metal hydroxide for about one hour.

HARRY N. HUNTZICKER.